(12) United States Patent
Li

(10) Patent No.: US 10,866,818 B2
(45) Date of Patent: Dec. 15, 2020

(54) GAME RENDERING METHOD, TERMINAL DEVICE, AND NON-TRANSITORY COMPUTER-READABLE STORAGE MEDIUM

(71) Applicant: Guangdong Oppo Mobile Telecommunications Corp., Ltd., Guangdong (CN)

(72) Inventor: Senlin Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/525,038

(22) Filed: Jul. 29, 2019

(65) Prior Publication Data
US 2020/0081722 A1 Mar. 12, 2020

(30) Foreign Application Priority Data
Sep. 12, 2018 (CN) .......................... 2018 1 1061909

(51) Int. Cl.
G06F 9/44 (2018.01)
G06F 9/448 (2018.01)
(52) U.S. Cl.
CPC ................... *G06F 9/449* (2018.02)
(58) Field of Classification Search
None
See application file for complete search history.

(56) References Cited

U.S. PATENT DOCUMENTS

| 2007/0192818 A1 | 8/2007 | Bourges-Sevenier et al. |
| 2015/0347198 A1 | 12/2015 | Lee et al. |
| 2016/0162171 A1 | 6/2016 | Yi |

FOREIGN PATENT DOCUMENTS

| CN | 104778082 A | 7/2015 |
| CN | 106453852 A | 2/2017 |
| CN | 106504185 A | 3/2017 |
| CN | 107436797 A | 12/2017 |
| CN | 107832108 A | 3/2018 |
| CN | 107911708 A | 4/2018 |
| CN | 107913519 A | 4/2018 |
| WO | 2018050003 A1 | 3/2018 |

OTHER PUBLICATIONS

Extended European search report issued in corresponding application No. 19189588.7 dated Jan. 30, 2020.
International search report issued in corresponding international application No. PCT/CN2019/099300 dated Apr. 13, 2020.
The first office action and English translation issued on corresponding CN application No. 201811061909.2 dated Oct. 10, 2020.

*Primary Examiner* — Craig C Dorais

(57) ABSTRACT

The present disclosure discloses a game rendering method and a terminal device. The terminal device includes a JS layer, a bridge layer, and a system framework layer. The method includes the follows. The JS layer transmits drawing instructions cached in an instruction set to the bridge layer, when a number of the drawing instructions cached in the instruction set is greater than or equal to a first threshold. The bridge layer obtains a rendering result by using an OpenGL capability to process the drawing instructions, and transmits the rendering result to the system framework layer. The system framework layer performs rendering based on the rendering result.

20 Claims, 4 Drawing Sheets

GAME RENDERING METHOD, TERMINAL DEVICE, AND NON-TRANSITORY COMPUTER-READABLE STORAGE MEDIUM

CROSS-REFERENCE TO RELATED APPLICATION(S)

This application claims priority to Chinese Patent Application No. 201811061909.2, filed on Sep. 12, 2018, the entire disclosure of which is hereby incorporated by reference in its entirety.

TECHNICAL FIELD

The present disclosure relates to the field of electronic technology, and more particularly to a game rendering method, a terminal device, and a non-transitory computer-readable storage medium.

BACKGROUND

With popularization and widely use of electronic devices (such as mobile phones, tablets, etc.), more and more applications can be supported by the electronic devices, and functions of the electronic devices are becoming more and more powerful, which causes the electronic devices to develop towards diversification and individualization, and become indispensable electronic produces in users' lives.

In particular, games are widely used in electronic devices. For games, rendering effects directly affect the user's visual experience. Therefore, how to improve rendering performance needs to be solved urgently.

SUMMARY

Implementations of the present disclosure provide a game rendering method, a terminal device, and a non-transitory computer-readable storage medium.

According to a first aspect, the implementation of the present disclosure provides a game rendering method, which is applied to a terminal device. The terminal device includes a JavaScript (JS) layer, a bridge layer and a system framework layer. The method includes the follows. The JS layer transmits drawing instructions cached in an instruction set to the bridge layer, when a number of the drawing instructions cached in the instruction set is greater than or equal to a first threshold. The bridge layer obtains a rendering result by using an OpenGL capability to process the drawing instructions, and transmits the rendering result to the system framework layer. The system framework layer performs rendering based on the rendering result.

According to a second aspect, the implementation of the present disclosure provides a terminal device, which includes at least one processor and a computer readable storage coupled to the at least one processor. The computer readable storage stores computer programs thereon, which when executed by the processor, cause the processor to: transmit drawing instructions cached in an instruction set to a bridge layer by a JS layer, when a number of the drawing instructions cached in the instruction set is greater than or equal to a first threshold; obtain a rendering result by the bridge layer using an OpenGL capability to process the drawing instructions; transmit the rendering result to a system framework layer by the bridge layer; and perform rendering based on the rendering result by the system framework layer.

According to a third aspect, the implementation of the present disclosure provides a non-transitory computer-readable storage medium. The non-transitory computer-readable storage medium is configured to store computer programs for electronic data exchange which, when executed by a processor, cause the processor to: transmit drawing instructions cached in an instruction set to a bridge layer by a JS layer, when a number of the drawing instructions cached in the instruction set is greater than or equal to a first threshold; obtain a rendering result by the bridge layer using an OpenGL capability to process the drawing instructions; transmit the rendering result to a system framework layer by the bridge layer; and perform rendering based on the rendering result by the system framework layer.

BRIEF DESCRIPTION OF THE DRAWINGS

To describe technical solutions in the implementations of the present disclosure or of the related art more clearly, the following briefly introduces the accompanying drawings required for describing the implementations of the present disclosure or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
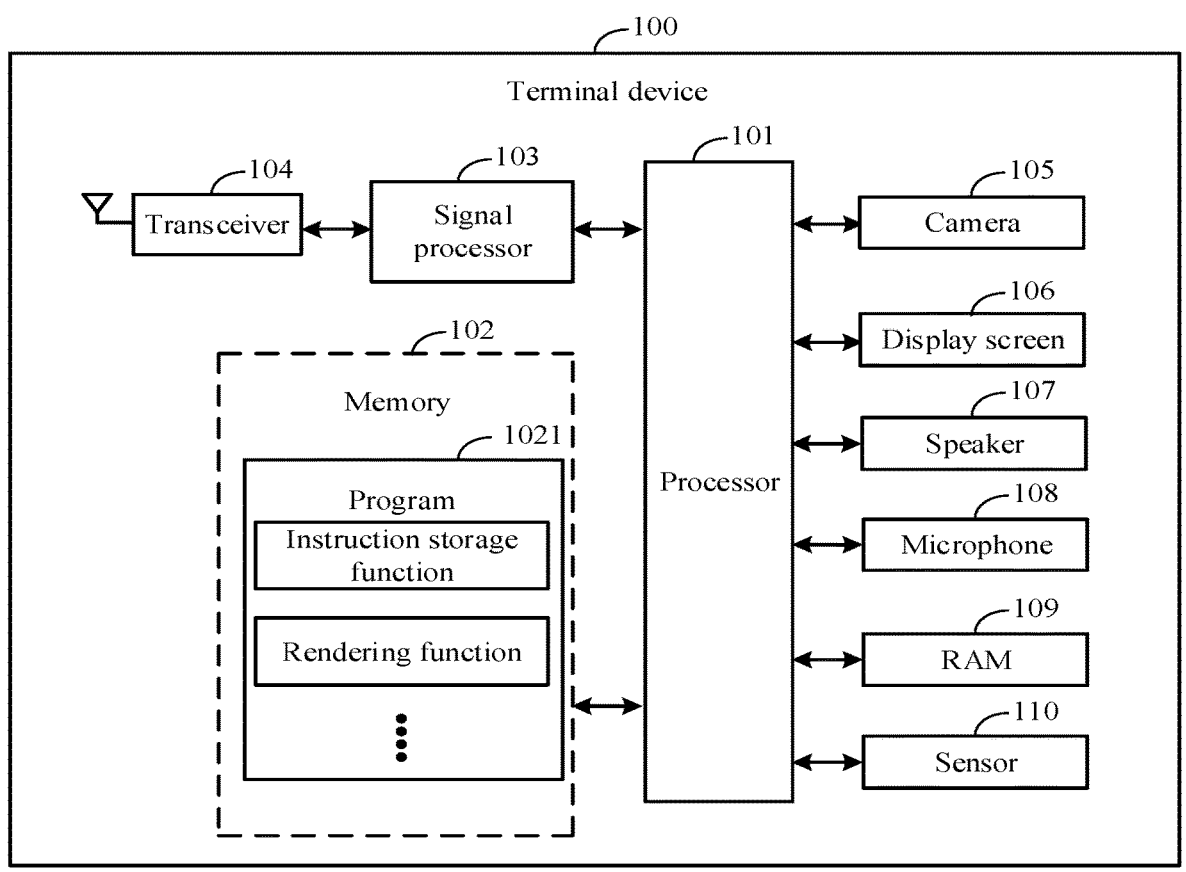
FIG. 1 is a schematic structural diagram of a terminal device according to an implementation of the present disclosure.

In order to enable those skilled in the art to better understand technical solutions of the present disclosure, the technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompany drawings of the present disclosure are used to distinguish different objects, rather than describe a particular order. The terms "include", "comprise", and "have" as well as variations thereof are intended to cover non-exclusive inclusion. For example, a process, a method, a system, a product, or an apparatus including a series of steps or units is not limited to the listed steps or units, on the contrary, it can optionally include other steps or units that are not listed; alternatively, other steps or units inherent to the process, method, product, or device can be included either.

The term "implementation" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

According to an implementation of the present disclosure, a game rendering method is provided, which is applied to a terminal device. The terminal device includes a JavaScript (JS) layer, a bridge layer and a system framework layer. The method includes the follows. The JS layer transmits drawing instructions cached in an instruction set to the bridge layer, when a number of the drawing instructions cached in the instruction set is greater than or equal to a first threshold. The bridge layer obtains a rendering result by using an OpenGL capability to process the drawing instructions, and transmits the rendering result to the system framework layer. The system framework layer performs rendering based on the rendering result.

According to an implementation of the present disclosure, a game rendering apparatus is provided, which is applied to a terminal device. The terminal device includes a JS layer, a bridge layer and a system framework layer. The game rendering apparatus includes a first transmitting unit, a first processing unit, a second transmitting unit, and a rendering unit. The first transmitting unit is configured to transmit drawing instructions cached in an instruction set to the bridge layer, when a number of the drawing instructions cached in the instruction set is greater than or equal to a first threshold. The first processing unit is configured to obtain a rendering result by using an OpenGL capability to process the drawing instructions. The second transmitting unit is configured to transmit the rendering result to the system framework layer. The rendering unit is configured to perform rendering based on the rendering result.

According to an implementation of the present disclosure, a terminal device is provided. The terminal device includes at least one processor and a computer readable storage coupled to the at least one processor. The computer readable storage stores computer programs thereon, which when executed by the processor, cause the processor to: transmit drawing instructions cached in an instruction set to a bridge layer by a JS layer, when a number of the drawing instructions cached in the instruction set is greater than or equal to a first threshold; obtain a rendering result by the bridge layer using an OpenGL capability to process the drawing instructions; transmit the rendering result to a system framework layer by the bridge layer; and perform rendering based on the rendering result by the system framework layer.

According to an implementation of the present disclosure, a non-transitory computer readable storage medium is provided. The non-transitory computer readable storage medium is configured to store computer programs which, when executed by a processor, cause the processor to: transmit drawing instructions cached in an instruction set to a bridge layer by a JS layer, when a number of the drawing instructions cached in the instruction set is greater than or equal to a first threshold; obtain a rendering result by the bridge layer using an OpenGL capability to process the drawing instructions; transmit the rendering result to a system framework layer by the bridge layer; and perform rendering based on the rendering result by the system framework layer.

According to an implementation of the present disclosure, a computer program product is provided. The computer program product includes a non-transitory computer-readable storage medium that stores computer programs which, when executed by a processor, cause the processor to: transmit drawing instructions cached in an instruction set to a bridge layer by a JS layer, when a number of the drawing instructions cached in the instruction set is greater than or equal to a first threshold; obtain a rendering result by the bridge layer using an OpenGL capability to process the drawing instructions; transmit the rendering result to a system framework layer by the bridge layer; and perform rendering based on the rendering result by the system framework layer.

The implementations of the present disclosure will be described in detail below with reference to the accompanying drawings.

Terminal devices, also known as user equipment (UE), are devices that provide voice and/or data communication function to a user, for example, hand-held devices or in-vehicle devices having a wireless connection function. Common terminals include, for example, mobile phones, tablets, notebook computers, PDAs, mobile internet devices (MIDs), wearable devices such as smart watches, smart bracelets, pedometers, etc.

FIG. 1 is a schematic structural diagram of a terminal device 100 according to an implementation of the present disclosure. The terminal device 100 includes a processor 101, a memory 102, a signal processor 103, a transceiver 104, a display screen 106, a speaker 107, a microphone 108, a random access memory (RAM) 109, a camera 105, a sensor 110, and the like. The memory 102, the signal processor 103, the display screen 106, the speaker 107, the microphone 108, the RAM 109, the camera 105, and the sensor 110 are connected to the processor 101, and the transceiver 104 is connected to the signal processor 103.

The display screen 106 may be a liquid crystal display (LCD), an organic light-emitting diode (OLED) panel, inorganic light-emitting diode panel, an active matrix organic light emitting diode (AMOLED) panel, and the like.

The camera 105 may be an ordinary camera or an infrared camera, which is not limited herein. The camera 105 may be a front camera or a rear camera, which is not limited herein.

The sensor 110 includes at least one of the following: a photosensitive sensor, a gyroscope, an infrared proximity sensor, a fingerprint sensor, a pressure sensor, and the like. The photosensitive sensor, also known as an ambient light sensor, is used to detect ambient light brightness. The photosensitive sensor can include a photosensitive element and an analog-to-digital converter. The photosensitive element is configured to convert a collected optical signal into an electrical signal, and the analog-to-digital converter is configured to convert the electrical signal into a digital signal. Optionally, the photosensitive sensor may further include a signal amplifier. The electrical signal converted by the photosensitive element can be amplified by the signal amplifier and be output to the analog-to-digital converter. The photosensitive element may include at least one of a photo-diode, a photo-transistor, a photo-resistor, and a silicon photocell.

The processor 101 is a control center of the terminal device 100, and connects various parts of the whole terminal device through various interfaces and lines, runs or executes software programs and/or modules stored in the memory, and invokes data stored in the memory to perform various functions of the terminal device and processes data, thereby monitoring the terminal device as a whole.

The processor 101 can integrate an application processor and a modem processor, where the application processor mainly processes an operating system, user interfaces, applications, and the like, and the modem processor mainly processes wireless communication. It can be understood that the above-mentioned modem processor may also not be integrated into the processor.

The memory 102 is configured to store software programs 1021 and/or modules, and the processor 101 executes various functional applications and data processing of the terminal device by running the software programs and/or modules stored in the memory 102. The memory 102 may mainly include a program storage area and a data storage area. The program storage area may store an operating system, software programs required for at least one function, and the like. The data storage area may store data created according to use of the terminal device or the like. In addition, the memory 102 may include a high-speed RAM, and may further include a non-volatile memory such as at least one disk storage device, flash memory device, or other volatile solid state storage device.

Figure 2:
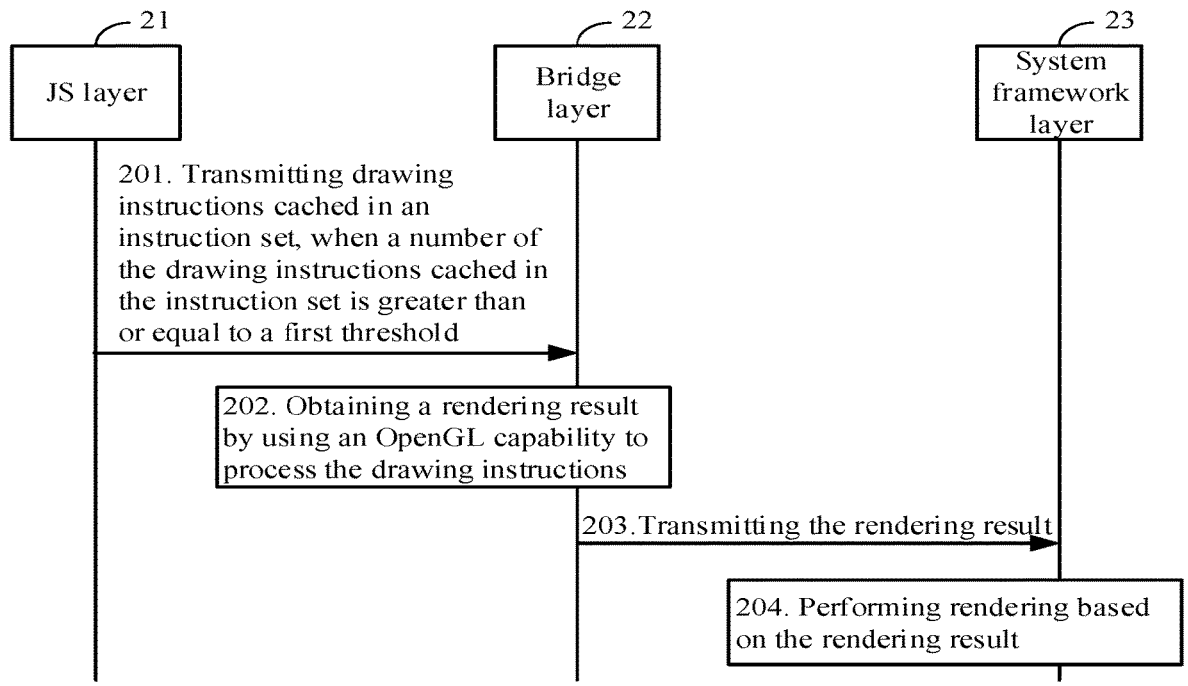
FIG. 2 is a schematic flowchart of a game rendering method according to an implementation of the present disclosure.
Figure 3:
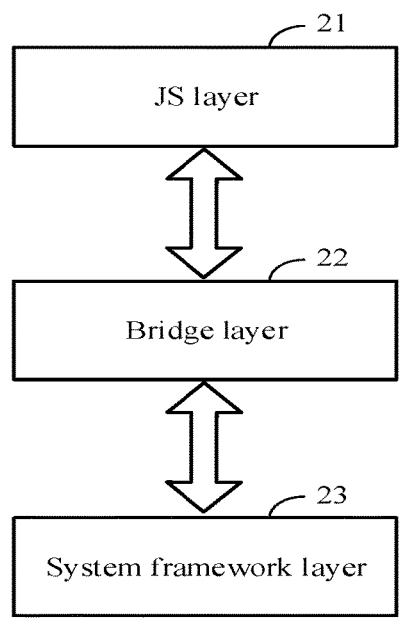
FIG. 3 is a schematic diagram showing a distribution of a system framework layer, a bridge layer, and a JS layer according to an implementation of the present disclosure.

FIG. 2 is a schematic flowchart of a game rendering method according to an implementation of the present disclosure. The method is applied to the foregoing terminal device 100. The terminal device 100 includes a JS layer 21, a bridge layer 22, and a system framework layer 23. As illustrated in FIG. 3, the system framework layer 23 can be understood as an underlying layer, which is responsible for providing system capabilities related to the underlying layer of the terminal device 100, such as a capability to access the memory, a capability to make phone calls, etc. The JS layer 21 can be understood as an upper layer, which is responsible for running mini-games. Game codes of the mini-games can be run in the JS layer 21, and the JS layer 21 can also be called JavaScript layer. The bridge layer 22 can be understood as a middle layer, which is configured to connect the system framework layer 23 and the JS layer 21. The bridge layer 22 can encapsulate the capabilities of the system framework layer 23 into a unified application programming interface (API) that can be directly invoked by the JS layer 21. Each of the system framework layer 23, the bridge layer 22 and the JS layer 21 in the implementations of the present disclosure can be understood as a piece of codes. For example, the system framework layer 23 can be a piece of program codes written in assembly language. The bridge layer 22 can be a piece of program codes written in C++ language. The bridge layer 22 can also be called a C++ layer. The JS layer 21 can be a piece of program codes written in Java language. The game rendering method of the present disclosure can be applied to different types of systems, such as Android system and IOS system.

The game rendering method includes the follows.

At block 201, when a number of drawing instructions cached in an instruction set is greater than or equal to a first threshold, the JS layer transmits the drawing instructions cached in the instruction set to the bridge layer.

In the implementation, the game rendering method provided by the present disclosure is configured to render mini-games. The mini-game is a kind of game application that can be played without being downloaded and installed, which is similar to small programs in WeChat application.

The instruction set is configured to cache the drawing instructions, such as WebGL drawing instructions. The instruction set can be stored at a designated area of the terminal device, and can be invoked by the JS layer.

In the implementation, for the terminal device, different mini-games have different instruction sets, in order to avoid invocation errors made by the JS layer.

The storage areas of the instruction sets corresponding to different mini-games may be different (e.g., an instruction set "a" corresponding to a mini-game "A" is stored in a designated area "1", an instruction set "b" corresponding to a mini-game "B" is stored in a designated area "2", etc.) or the same (e.g., the instruction set "a" corresponding to the mini-game "A" and the instruction set "b" corresponding to the mini-game "B" are both stored in the designated area "1", etc.).

Web graphics library (WebGL) is a kind of 3D drawing protocol. The kind of drawing technology standard allows JavaScript to be combined with open graphics library (OpenGL) ES 2.0. By adding a JavaScrip binding of OpenGL ES 2.0, WebGL can provide hardware 3D accelerated rendering.

In the implementation, the first threshold may be defined by a user, or may be customized by the terminal device, which is not limited herein.

The first threshold is, for example, 10, 20, 23, 30, or other values. In an implementation, for terminal devices, the first thresholds corresponding to different mini-games are the same, to facilitate management of the terminal device.

In another implementation, for the terminal device, the first thresholds corresponding to different mini-games are different (e.g., the mini-game "A" corresponds to a first threshold "1", the mini-game "B" corresponds to a first threshold "2", etc.), to enhance diversity. The first threshold corresponding to a mini-game with lower rendering level requirement is larger, while the first threshold corresponding to a mini-game with higher rendering level requirement is smaller.

In an implementation, the action in the block 201 is specifically implemented as follow. The JS layer acquires all of the drawing instructions cached in the instruction set, and transmits the acquired drawing instructions to a Java Script binding (JSB), and the JSB transmits the drawing instructions to the bridge layer. The JSB is a connection engine configured to establish communication between different platforms (such as the bridge layer, the system framework layer, etc.) and the JS layer.

At block 202, the bridge layer obtains a rendering result by using an OpenGL capability to process the drawing instructions.

In the implementation, the OpenGL refers to a professional graphical program interface that defines a cross-programming language and cross-platform programming interface specification. The OpenGL is a hardware-independent software interface. The software interface provides functions that are accessible by other software or hardware.

The OpenGL capability refers to providing some functions to enable other software or hardware to invoke these functions to implement some functions, such as instruction processing functions, rendering functions, and so on.

In an implementation, the actions in the block 202 is specifically implemented as follow. The bridge layer obtains instruction information by parsing the drawing instructions, uses the OpenGL capability to generate an OpenGL drawing command corresponding to the drawing instructions according to the instruction information, and forms a rendering result by drawing the OpenGL drawing command into an OpenGL rendering window.

In the implementation, the instruction information includes but is not limited to an instruction name and instruction parameters, for example, for a drawing instruction: drawCircle (200, 300, 5), the instruction name is: drawCircle, and the instruction parameters are: x coordinate is 200, y coordinate is 300, radius is 5.

Further, the action that the bridge layer uses the OpenGL capability to generate the OpenGL drawing command corresponding to the drawing instructions according to the instruction information is specifically implemented as follow. The bridge layer uses the OpenGL capability to generate the OpenGL drawing command according to a preset instruction conversion rule and the instruction information. For example, the OpenGL drawing command with a preset form (i.e., standardized expression form of the instruction information) is formed by presetting an instruction conversion rule to splice various instruction information.

At block 203, the bridge layer transmits the rendering result to the system framework layer.

The actions in the block 203 is specifically implemented as follow. The bridge layer caches the rendering result into a pixel buffer, and transmits the rendering result to the system framework layer by exchanging data with a screen buffer through the pixel buffer.

At block 204, the system framework layer performs rendering based on the rendering result.

The actions in the block 204 is specifically implemented as follow. The system framework layer transmits the rendering result to a surface flinger, synthesizes screen contents through the surface flinger based on the rendering result, and displays the synthesized screen contents on a display screen of the terminal device.

In the implementation, the surface flinger is an independent service, which receives surfaces of all windows as an input, calculates positions of each surface in a final synthesized image according to parameters of each Surface, such as ZOrder, transparency, size, location, etc., and then the positions is transmitted to HWComposer or OpenGL to generates a final display Buffer, which is then displayed on a specific display device.

It can be seen that, in the implementations of the present disclosure, the JS layer directly invokes the OpenGL capability of the underlying layer of the system through the bridge layer, thereby improving the rendering performance. In addition, the processing of the drawing instructions is performed together only when the number of the drawing instructions cached in the instruction set exceeds a certain number, thereby reducing the number of times for invoking the OpenGL capability and reducing the power consumption of the terminal device.

In an implementation of the present disclosure, the method further includes the follows.

The JS layer receives a game service code.

The JS layer invokes a WebGL capability by invoking a WebGL API.

The JS layer obtains an operation instruction by using the WebGL capability to parse the game service code.

When the operation instruction is not a query instruction, the JS layer determines whether the number of the drawing instructions cached in the instruction set is greater than or equal to the first threshold.

In the implementation, the WebGL capability refers to providing some functions to enable other software or hardware to invoke these functions to implement some functions, such as code parsing functions, instruction processing functions, and so on.

The game service code refers to a development code of a game developer, which can be understood as the code for executing the game logic. Since the game service code is the code for executing the game logic, the JS layer can obtain some operation instructions for executing the game logic by parsing the game service code.

In the implementation, game-related instructions include drawing instructions, query instructions, and the like.

Further, the method includes the follows.

When the operation instruction is a query instruction, the JS layer transmits the operation instruction to the bridge layer.

The bridge layer obtains a query result by using the OpenGL capability to process the operation instruction.

The bridge layer transmits the query result to the JS layer.

Specifically, the action that the JS layer transmits the operation instruction to the bridge layer is specifically implemented as follow. The JS layer obtains instruction information carried in the operation instruction by parsing the operation instruction, and then transmits the obtained instruction information to the bridge layer.

The instruction information carried in the operation instruction includes, but is not limited to, an instruction name and instruction parameters.

Further, the JS layer may transmit the instruction information carried by the operation instruction to the bridge layer by means of direct transmission, or by means of indirect transmission, such as generating a query command corresponding to the operation instruction according to the preset instruction conversion rule and the instruction information, and then transmits the query command to the bridge layer. The processing way can make the subsequent links easy to parse the command.

Further, the method includes the follows.

When the operation instruction is not a query instruction and the number of the drawing instructions cached in the instruction set is less than the first threshold, the JS layer caches the operation instruction into the instruction set.

It can be seen that, in the implementation of the present disclosure, the instructions include query instructions and non-query instructions. When the instruction is a query instruction, the OpenGL capability is directly invoked. When the instruction is a non-query instruction, the OpenGL capabilities is invoked only when the number of cached instructions reaches a certain value, which improves the rendering performance.

In an implementation of the present disclosure, the method further includes the follows.

The system framework layer performs screen refresh, and displays each refreshed frame image on the display screen of the terminal device through Ondrawframe.

The system framework layer invokes a native render, and monitors whether a tick event is existed in the JS layer by using the native render to invoke a dispatch tick event function of the bridge layer through the java native interface (JNI).

When a tick event is existed, the action of the JS layer transmitting the drawing instructions cached in the instruction set to the bridge layer is performed.

In the implementation, JNI provides several APIs to achieve communication between Java and other languages (mainly C&C++), which allows Java codes to interact with codes written in other languages.

Figure 4:
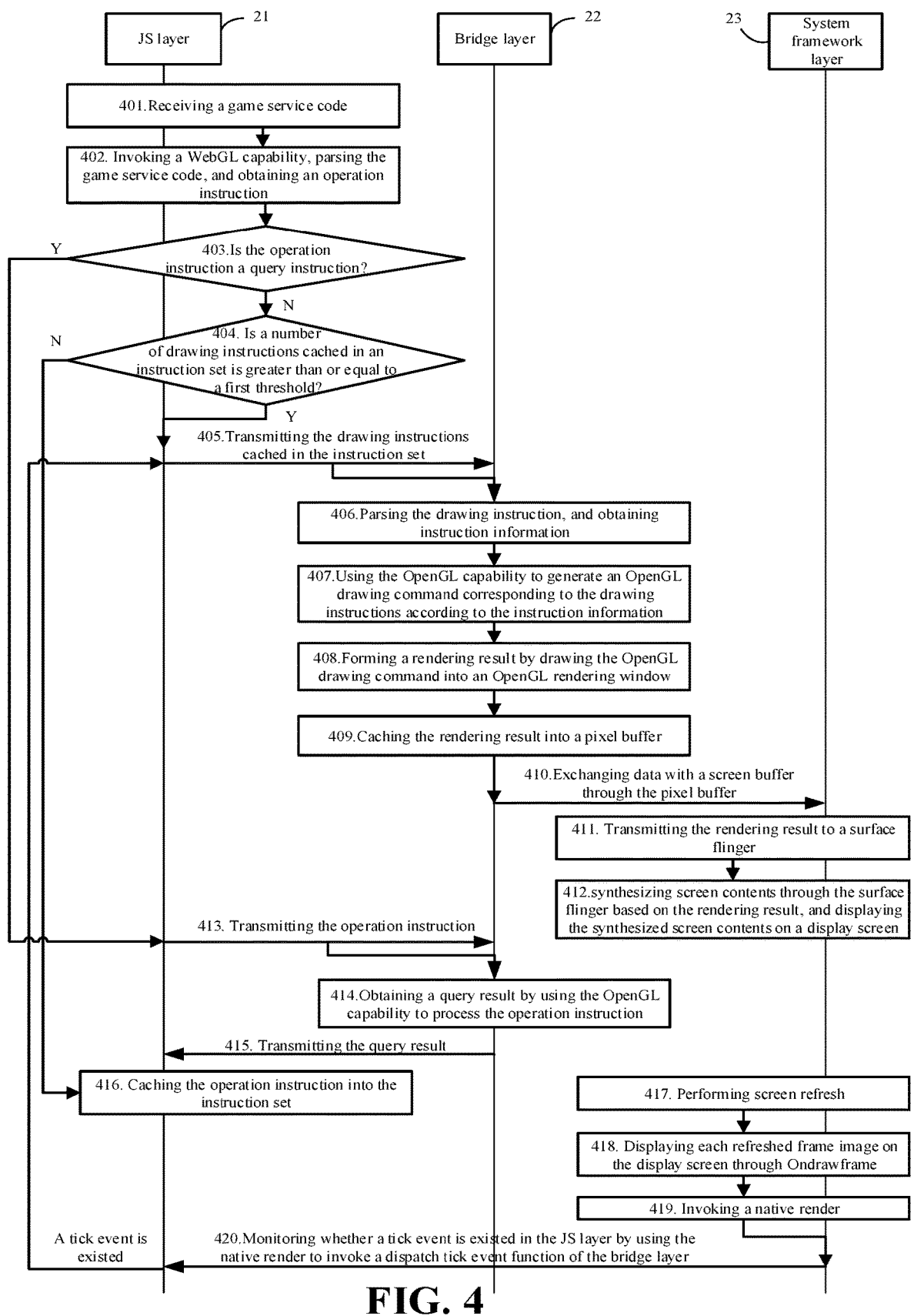
FIG. 4 is a schematic flowchart of another game rendering method according to an implementation of the present disclosure.

Consistent with the implementation illustrated in FIG. 2, FIG. 4 is a schematic flowchart of another game rendering method according to an implementation of the present disclosure. The method is applied to the above-mentioned terminal device 100. The terminal device 100 includes the JS layer 21, the bridge layer 22, and the system framework layer 23. The distribution of the system framework layer 23, the bridge layer 22 and the JS layer 21 are illustrated in FIG. 3. The game rendering method includes the follows.

At block 401, the JS layer receives a game service code.

At block 402, the JS layer invokes a WebGL capability by invoking a WebGL API, and obtains an operation instruction by using the WebGL capability to parse the game service code.

At block 403, the JS layer determines whether the operation instruction is a query instruction.

If the operation instruction is not a query instruction, the action at block 404 is performed.

If the operation instruction is a query instruction, the action at block 413 is performed.

At block 404, the JS layer determines whether a number of drawing instructions cached in a instruction set is greater than or equal to a first threshold.

If the number is greater than or equal to the first threshold, the action at block 405 is performed.

If the number is not greater than or equal to the first threshold, the action at block 416 is performed.

At block 405, the JS layer transmits the drawing instructions cached in the instruction set to the bridge layer.

At block 406, the bridge layer obtains instruction information by parsing the drawing instructions.

At block 407, the bridge layer uses the OpenGL capability to generate an OpenGL drawing command corresponding to the drawing instructions according to the instruction information.

At block 408, the bridge layer forms a rendering result by drawing the OpenGL drawing command into an OpenGL rendering window.

At block 409, the bridge layer caches the rendering result into a pixel buffer.

At block 410, the bridge layer transmits the rendering result to the system framework layer by exchanging data with a screen buffer through the pixel buffer.

At block 411, the system framework layer transmits the rendering result to a surface flinger.

At block 412, the system framework layer synthesizes screen contents through the surface flinger based on the rendering result, and displays the synthesized screen contents on a display screen of the terminal device.

At block 413, the JS layer transmits the operation instruction to the bridge layer.

At block 414, the bridge layer obtains a query result by using the OpenGL capability to process the operation instruction.

At block 415, the bridge layer transmits the query result to the JS layer.

At block 416, the JS layer caches the operation instruction into the instruction set.

At block 417, the system framework layer performs screen refresh.

At block 418, the system framework layer displays each refreshed frame image on the display screen of the terminal device through Ondrawframe.

At block 419, the system framework layer invokes a native render.

At block 420, the system framework layer monitors whether a tick event is existed in the JS layer by using the native render to invoke a dispatch tick event function of the bridge layer.

When a tick event is existed, the action at block 405 is performed.

It should be noted that the specific implementation process of the present implementation may be referred to the specific implementation process described in the above-mentioned method implementation, and is not described herein.

Figure 5:
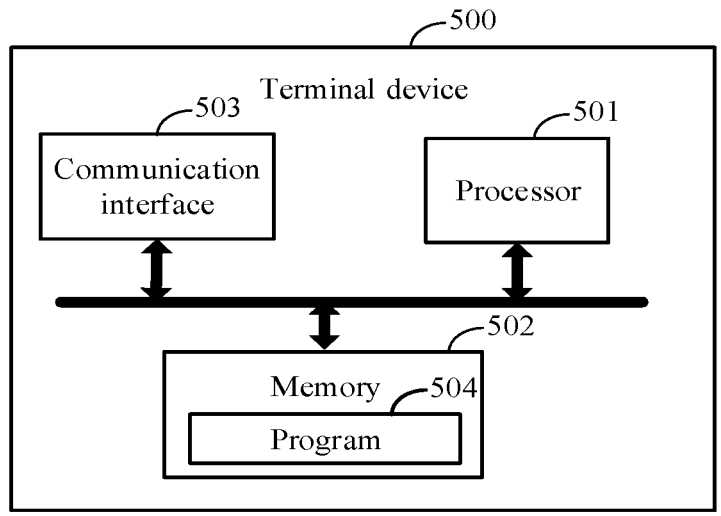
FIG. 5 is another schematic structural diagram of the terminal device according to an implementation of the present disclosure.

Consistent with the implementations illustrated in FIGS. 2 and 4, FIG. 5 is a schematic structural diagram of a terminal device 500 according to an implementation of the present disclosure. The terminal device 500 includes a JS layer, a bridge layer, and a system framework layer. As illustrated, the terminal device 500 further includes at least one processor 501, a memory 502, a communication interface 503, and one or more computer programs 504. The one or more computer programs 504 are stored in the memory 502 and configured to be executed by the processor 501. The processor 501 is configured to execute the computer programs 504 to implement the game rendering method described in the foregoing implementations of the present disclosure.

Specifically, the computer programs include computer executable instructions which when executed by the processor 501, cause the processor 501 to carry out the following actions.

When a number of drawing instructions cached in an instruction set is greater than or equal to a first threshold, the drawing instructions cached in the instruction set is transmitted to the bridge layer by the JS layer.

A rendering result is obtained by the bridge layer using an OpenGL capability to process the drawing instructions.

The rendering result is transmitted to the system framework layer by the bridge layer.

Rendering is performed based on the rendering result by the system framework layer.

In an implementation of the present disclosure, the computer executable instructions further cause the processor 501 to carry out the following actions.

A game service code is received by the JS layer.

A WebGL capability is invoked by the JS layer invoking a WebGL API.

An operation instruction is obtained by the JS layer using the WebGL capability to parse the game service code.

When the operation instruction is not a query instruction, whether the number of the drawing instructions cached in the instruction set is greater than or equal to the first threshold is determined by the JS layer.

In an implementation of the present disclosure, the computer executable instructions further cause the processor 501 to carry out the following actions.

When the operation instruction is a query instruction, the operation instruction is transmitted to the bridge layer by the JS layer.

A query result is obtained by the bridge layer using the OpenGL capability to process the operation instruction.

The query result is transmitted to the JS layer by the bridge layer.

In an implementation of the present disclosure, the computer executable instructions further cause the processor 501 to carry out the following actions.

When the operation instruction is not a query instruction and the number of the drawing instructions cached in the instruction set is less than the first threshold, the operation instruction is cached into the instruction set by the JS layer.

In an implementation of the present disclosure, the computer executable instructions that cause the processor 501 to carry out the action that a rendering result is obtained by the bridge layer using an OpenGL capability to process the drawing instructions, specifically cause the processor 501 to carry out the following actions.

Instruction information is obtained by the bridge layer parsing the drawing instructions.

An OpenGL drawing command corresponding to the drawing instructions is generated according to the instruction information by the bridge layer using the OpenGL capability.

A rendering result is formed by the bridge layer drawing the OpenGL drawing command into an OpenGL rendering window.

In an implementation of the present disclosure, the computer executable instructions that cause the processor 501 to carry out the action that the rendering result is transmitted to the system framework layer by the bridge layer, specifically cause the processor 501 to carry out the following actions.

The rendering result is cached into a pixel buffer by the bridge layer.

The rendering result is transmitted to the system framework layer by the bridge layer exchanging data with a screen buffer through the pixel buffer.

In an implementation of the present disclosure, the computer executable instructions that cause the processor 501 to carry out the action that rendering is performed based on the rendering result by the system framework layer, specifically cause the processor 501 to carry out the following actions.

The rendering result is transmitted to a surface flinger by the system framework layer.

Screen contents is synthesized based on the rendering result by the surface flinger, and the synthesized screen contents is displayed on a display screen of the terminal device.

In an implementation of the present disclosure, the computer executable instructions further cause the processor 501 to carry out the following actions.

Screen refresh is performed by the system framework layer, and each refreshed frame image is displayed on the display screen of the terminal device through Ondrawframe.

A native render is invoked by the system framework layer, and whether a tick event is existed in the JS layer is monitored by using the native render to invoke a dispatch tick event function of the bridge layer.

When a tick event is existed, the action that the drawing instructions cached in the instruction set is transmitted to the bridge layer by the JS layer is performed.

It should be noted that the specific implementation process of the present implementation may be referred to the specific implementation process described in the foregoing method implementation, and is not described herein.

The foregoing implementations mainly introduce the solution of the implementations of the present disclosure from the perspective of performing the process on the method side. It can be understood that in order to achieve the above functions, the terminal device includes corresponding hardware structures and/or software modules to perform each function. Those skilled in the art will readily appreciate that the present disclosure can be implemented in a form of hardware or a combination of hardware and computer software in combination with the elements and algorithm steps of the various examples described in the implementations disclosed herein. Whether a function is implemented in hardware or computer software-driven hardware depends on the specific application and design constraints of the technical solution. Professional technicians may use different methods to implement the described functions for each particular application, but such implementation should not be considered to be beyond the scope of this disclosure.

The implementations of the present disclosure may perform functional units division on the terminal device according to the method implementations. For example, each functional unit may be divided according to each function, or two or more functions may be integrated into one processing unit. The integrated unit can be implemented in the form of hardware or in the form of software functional units. It should be noted that the division of the units in the implementations of the present disclosure is schematic, and is only a logical functional division. In actual implementation, there may be another division manner.

Figure 6:
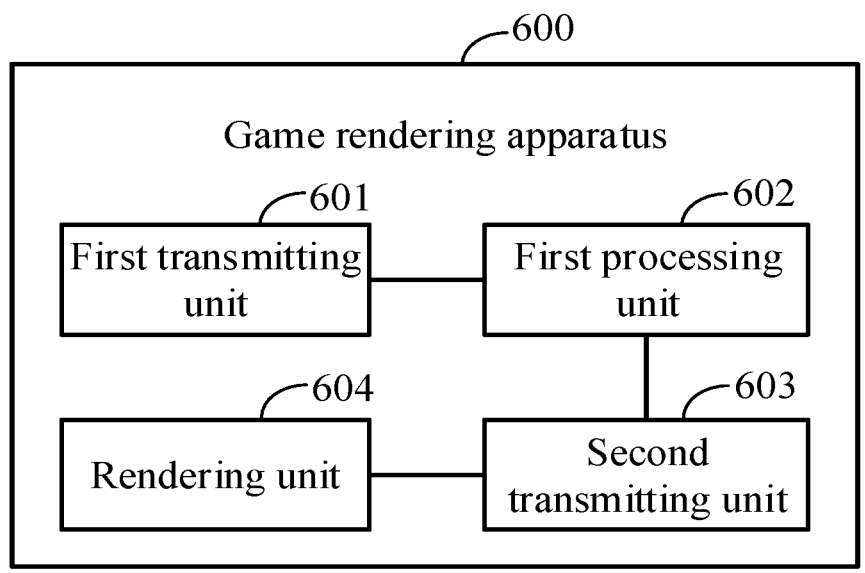
FIG. 6 is a schematic structural diagram of a game rendering apparatus according to an implementation of the present disclosure.

The following is an apparatus implementation of the present disclosure, which is used to implement the method implemented by the method implementation of the present disclosure. FIG. 6 is a schematic structural diagram of a game rendering apparatus 600 according to an implementation of the present disclosure, which is applied to a terminal device. The terminal device includes a JS layer, a bridge layer and a system framework layer. As illustrated in FIG. 6, the game rendering apparatus 600 includes a first transmitting unit 601, a first processing unit 602, a second transmitting unit 603, and a rendering unit 604.

The first transmitting unit 601 is configured to transmit drawing instructions cached in an instruction set to the bridge layer, when a number of the drawing instructions cached in the instruction set is greater than or equal to a first threshold.

The first processing unit 602 is configured to obtain a rendering result by using an OpenGL capability to process the drawing instructions.

The second transmitting unit 603 is configured to transmit the rendering result to the system framework layer.

The rendering unit 604 is configured to perform rendering based on the rendering result.

In an implementation of the present disclosure, the game rendering apparatus 600 further includes the follows.

A receiving unit is configured to receive a game service code.

A first invoking unit is configured to invoke a WebGL capability by invoking a WebGL API.

A parsing unit is configured to obtain an operation instruction by using the WebGL capability to parse the game service code.

A determining unit is configured to determine whether the number of the drawing instructions cached in the instruction set is greater than or equal to the first threshold, when the operation instruction is not a query instruction.

In an implementation of the present disclosure, the game rendering apparatus 600 further includes the follows.

A third transmitting unit is configured to transmit the operation instruction to the bridge layer when the operation instruction is a query instruction.

A second processing unit is configured to obtain a query result by using the OpenGL capability to process the operation instruction.

A fourth transmitting unit is configured to transmit the query result to the JS layer.

In an implementation of the present disclosure, the game rendering apparatus 600 further includes the follows.

A caching unit is configured to cache the operation instruction into the instruction set, when the operation instruction is not a query instruction and the number of drawing instructions cached in the instruction set is less than the first threshold.

In an implementation of the present disclosure, the first processing unit 602 is specifically configured to obtain instruction information by parsing the drawing instructions, use the OpenGL capability to generate an OpenGL drawing command corresponding to the drawing instructions according to the instruction information, and form a rendering result by drawing the OpenGL drawing command into an OpenGL rendering window.

In an implementation of the present disclosure, the second transmitting unit 603 is specifically configured to cache the rendering result into a pixel buffer, and transmit the rendering result to the system framework layer by exchanging data with a screen buffer through the pixel buffer.

In an implementation of the present disclosure, the rendering unit 604 is specifically configured to transmit the rendering result to a surface flinger, synthesizes screen contents through the surface flinger based on the rendering result, and display the synthesized screen contents on a display screen of the terminal device.

In an implementation of the present disclosure, the game rendering apparatus 600 further includes the follows.

A refresh unit is configured to perform screen refresh.

A display unit is configured to display each refreshed frame image on the display screen of the terminal device through Ondrawframe.

A second invoking unit is configured to invoke a native render.

A monitor unit is configured to monitor whether a tick event is existed in the JS layer by using the native render to invoke a dispatch tick event function of the bridge layer.

When a tick event is existed, the first transmitting unit 601 transmits the drawing instructions cached in the instruction set to the bridge layer.

It is to be noted that, the functions of the first transmitting unit 601, the first processing unit 602, the second transmitting unit 603, the rendering unit 604, the receiving unit, the first invoking unit, the parsing unit, the determining unit, the third transmitting unit, the second processing unit, the fourth transmitting unit, the cache unit, the refresh unit, the display unit, the second invoking unit, and the monitor unit may be implemented by a processor.

Implementations of the present disclosure further provide a non-transitory computer readable storage medium, on which computer programs for electronic data interchange are stored. The computer programs are executed by a processor to implement the game rendering method described in the foregoing implementations of the present disclosure.

Specifically, the computer programs are executed by the processor to carry out the following actions. A JS layer transmits drawing instructions cached in an instruction set to a bridge layer, when a number of the drawing instructions cached in the instruction set is greater than or equal to a first threshold. The bridge layer obtains a rendering result by using an OpenGL capability to process the drawing instructions, and transmits the rendering result to a system framework layer. The system framework layer performs rendering based on the rendering result.

Implementations of the present disclosure also provide a computer program product. The computer program product includes a non-transitory computer-readable storage medium that stores computer programs. The computer programs are executed by a processor to implement the game rendering method described in the foregoing implementations of the present disclosure. The computer program product can be a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions of other implementations.

In the implementations of the disclosure, the apparatus disclosed in implementations provided herein may be implemented in other manners. For example, the device/apparatus implementations described above are merely illustrative. For instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit may be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or part of the operations of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for game rendering being applied to a terminal device, the terminal device comprising a JavaScript (JS) layer, a bridge layer and a system framework layer, and the method comprising:
    the JS layer transmitting drawing instructions cached in an instruction set to the bridge layer, when a number of the drawing instructions cached in the instruction set is greater than or equal to a first threshold;
    the bridge layer obtaining a rendering result by using an OpenGL capability to process the drawing instructions;
    the bridge layer transmitting the rendering result to the system framework layer; and
    the system framework layer performing rendering based on the rendering result.

2. The method of claim 1, further comprising:
    the JS layer receiving a game service code;
    the JS layer invoking a WebGL capability;
    the JS layer obtaining an operation instruction by using the WebGL capability to parse the game service code; and
    the JS layer determining whether the number of the drawing instructions cached in the instruction set is greater than or equal to the first threshold, when the operation instruction is not a query instruction.

3. The method of claim 2, further comprising:
    the JS layer transmitting the operation instruction to the bridge layer, when the operation instruction is the query instruction;
    the bridge layer obtaining a query result by using the OpenGL capability to process the operation instruction; and
    the bridge layer transmitting the query result to the JS layer.

4. The method of claim 2, further comprising:
    the JS layer caching the operation instruction into the instruction set, when the operation instruction is not the query instruction and the number of the drawing instructions cached in the instruction set is less than the first threshold.

5. The method of claim 1, wherein the bridge layer obtaining the rendering result by using the OpenGL capability to process the drawing instructions comprises:
    the bridge layer obtaining instruction information by parsing the drawing instructions;
    the bridge layer using the OpenGL capability to generate an OpenGL drawing command corresponding to the drawing instructions according to the instruction information; and
    the bridge layer forming the rendering result by drawing the OpenGL drawing command into an OpenGL rendering window.

6. The method of claim 1, wherein the bridge layer transmitting the rendering result to the system framework layer comprises:
    the bridging layer caching the rendering result into a pixel buffer; and
    the bridging layer transmitting the rendering result to the system framework layer by exchanging data with a screen buffer through the pixel buffer.

7. The method of claim 1, wherein the system framework layer performing rendering based on the rendering result comprises:
    the system framework layer transmitting the rendering result to a surface flinger; and
    the system framework layer synthesizing screen contents through the surface flinger based on the rendering result, and displaying the synthesized screen contents on a display screen of the terminal device.

8. A terminal device, comprising:
    at least one processor; and
    a computer readable storage coupled to the at least one processor and storing computer programs thereon, which when executed by the processor, cause the processor to:
        transmit drawing instructions cached in an instruction set to a bridge layer by a JS layer, when a number of the drawing instructions cached in the instruction set is greater than or equal to a first threshold;
        obtain a rendering result by the bridge layer using an OpenGL capability to process the drawing instructions;
        transmit the rendering result to a system framework layer by the bridge layer; and
        perform rendering based on the rendering result by the system framework layer.

9. The terminal device of claim 8, wherein the computer programs further cause the processor to:
    receive a game service code by the JS layer;
    invoke a WebGL capability by the JS layer;
    obtain an operation instruction by the JS layer using the WebGL capability to parse the game service code; and
    determine, by the JS layer, whether the number of the drawing instructions cached in the instruction set is greater than or equal to the first threshold, when the operation instruction is not a query instruction.

10. The terminal device of claim 9, wherein the computer programs further cause the processor to:
    transmit the operation instruction to the bridge layer by the JS layer, when the operation instruction is the query instruction;
    obtain a query result by the bridge layer using the OpenGL capability to process the operation instruction; and
    transmit the query result to the JS layer by the bridge layer.

11. The terminal device of claim 9, wherein the computer programs further cause the processor to:
    cache the operation instruction into the instruction set by the JS layer, when the operation instruction is not the query instruction and the number of the drawing instructions cached in the instruction set is less than the first threshold.

12. The terminal device of claim 8, wherein the computer programs that cause the processor to obtain the rendering result by the bridge layer using an OpenGL capability to process the drawing instructions cause the processor to:
    obtain instruction information by the bridge layer parsing the drawing instructions;

use the OpenGL capability to generate an OpenGL drawing command corresponding to the drawing instructions according to the instruction information; and form the rendering result by the bridge layer drawing the OpenGL drawing command into an OpenGL rendering window.

13. The terminal device of claim 8, wherein the computer programs that cause the processor to transmit the rendering result to the system framework layer by the bridge layer cause the processor to:

cache the rendering result into a pixel buffer by the bridging layer; and transmit the rendering result to the system framework layer by the bridging layer exchanging data with a screen buffer through the pixel buffer.

14. The terminal device of claim 8, wherein the computer programs that cause the processor to perform rendering based on the rendering result by the system framework layer cause the processor to:

transmit the rendering result to a surface flinger by the system framework layer; and synthesize screen contents based on the rendering result by the surface flinger, and display the synthesized screen contents on a display screen of the terminal device.

15. A non-transitory computer-readable storage medium storing computer programs which, when executed by a processor, cause the processor to:

transmit drawing instructions cached in an instruction set to a bridge layer by a JS layer, when a number of the drawing instructions cached in the instruction set is greater than or equal to a first threshold;

obtain a rendering result by the bridge layer using an OpenGL capability to process the drawing instructions;

transmit the rendering result to a system framework layer by the bridge layer; and perform rendering based on the rendering result by the system framework layer.

16. The non-transitory computer-readable storage medium of claim 15, wherein the computer programs further cause the processor to:

receive a game service code by the JS layer;

invoke a WebGL capability by the JS layer;

obtain an operation instruction by the JS layer using the WebGL capability to parse the game service code; and determine, by the JS layer, whether the number of the drawing instructions cached in the instruction set is greater than or equal to the first threshold, when the operation instruction is not a query instruction.

17. The non-transitory computer-readable storage medium of claim 16, wherein the computer programs further cause the processor to:

transmit the operation instruction to the bridge layer by the JS layer, when the operation instruction is the query instruction;

obtain a query result by the bridge layer using the OpenGL capability to process the operation instruction; and transmit the query result to the JS layer by the bridge layer.

18. The non-transitory computer-readable storage medium of claim 16, wherein the computer programs further cause the processor to:

cache the operation instruction into the instruction set by the JS layer, when the operation instruction is not the query instruction and the number of the drawing instructions cached in the instruction set is less than the first threshold.

19. The non-transitory computer-readable storage medium of claim 15, wherein the computer programs that cause the processor to obtain the rendering result by the bridge layer using an OpenGL capability to process the drawing instructions cause the processor to:

obtain instruction information by the bridge layer parsing the drawing instructions;

use the OpenGL capability to generate an OpenGL drawing command corresponding to the drawing instructions according to the instruction information; and form the rendering result by the bridge layer drawing the OpenGL drawing command into an OpenGL rendering window.

20. The non-transitory computer-readable storage medium of claim 15, wherein the computer programs that cause the processor to transmit the rendering result to the system framework layer by the bridge layer cause the processor to:

cache the rendering result into a pixel buffer by the bridging layer; and transmit the rendering result to the system framework layer by the bridging layer exchanging data with a screen buffer through the pixel buffer.

* * * * *